US012378073B2

(12) United States Patent
Yoshinaga et al.

(10) Patent No.: US 12,378,073 B2
(45) Date of Patent: Aug. 5, 2025

(54) ARTICLE TRANSPORT VEHICLE

(71) Applicant: Daifuku Co., Ltd., Osaka (JP)

(72) Inventors: Kazuharu Yoshinaga, Hinocho (JP); Daiki Takagi, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 18/581,474

(22) Filed: Feb. 20, 2024

(65) Prior Publication Data

US 2024/0278989 A1    Aug. 22, 2024

(30) Foreign Application Priority Data

Feb. 21, 2023   (JP) ................... 2023-025519

(51) Int. Cl.
*B65G 1/04*          (2006.01)
(52) U.S. Cl.
CPC ................ *B65G 1/0492* (2013.01)

(58) Field of Classification Search
CPC ............... B65G 1/0492; B60K 11/08
See application file for complete search history.

(56) References Cited

U.S. PATENT DOCUMENTS

| 11,548,373 | B1 * | 1/2023 | Kurczewski | ........... B60K 11/08 |
| 2021/0130096 | A1 * | 5/2021 | Yoshinaga | ........... G06K 7/1413 |
| 2021/0339993 | A1 * | 11/2021 | Matsuda | ............. B65G 1/0471 |

FOREIGN PATENT DOCUMENTS

JP          2021181362 A       11/2021

\* cited by examiner

*Primary Examiner* — Jason D Shanske
*Assistant Examiner* — Matthew James O'Neill
(74) *Attorney, Agent, or Firm* — The Webb Law Firm

(57) ABSTRACT

An article transport vehicle includes a body, a wheel held by the body, a motor that drives the wheel, and a driver unit that controls the motor. The driver unit is disposed to extend in a front-back direction of the body in an upright posture. The body is provided, in a bottom section thereof, with an air guide path configured to guide travel-generated wind to a cooling surface.

9 Claims, 6 Drawing Sheets

ARTICLE TRANSPORT VEHICLE

CROSS-REFERENCE TO RELATED APPLICATION

This application claims priority to Japanese Patent Application No. 2023-025519 filed Feb. 21, 2023, the disclosure of which is hereby incorporated by reference in its entirety.

BACKGROUND OF THE INVENTION

1. Field of the Invention

The present invention relates to an article transport vehicle.

2. Description of Related Art

In facilities where articles stored, sorted and the like, for example, article transport vehicles that transport articles are utilized. An example of such an article transport vehicle is disclosed in JP 2021-181362A (Patent Document 1).

The article transport vehicle (unmanned transport vehicle 1) of Patent Document 1 includes a body (base 10), wheels (wheels 12), and a motor (motor) for driving the wheels, and, although not explicitly shown, is considered to include a driver unit. The driver unit often includes a plurality of semiconductor elements, and requires cooling due to heat generated during operation. Also, it is preferable that the driver unit is installed in relation to other constituent components in such a manner as to facilitate downsizing of the article transport vehicle as a whole. In this regard, Patent Document 1 does not particularly disclose how the driver unit is installed or the way in which the driver unit is efficiently cooled.

SUMMARY OF THE INVENTION

In view of the above, it is desirable to realize an article transport vehicle that is readily downsized as a whole and is able to efficiently cool the driver unit.

An article transport vehicle according to the present disclosure is:

An article transport vehicle for transporting an article, including:
  a body;
  a wheel held by the body;
  a motor configured to drive the wheel; and
  a driver unit configured to control the motor,
  wherein the driver unit is disposed to extend vertically and in a front-back direction of the body,
  in the driver unit, at least one surface facing in a width direction orthogonal to the front-back direction as viewed in an up-down direction is a cooling surface, and
  the body is provided, in a bottom section thereof, with an air guide path configured to guide travel-generated wind to the cooling surface.

According to this configuration, disposing the driver unit to extend in the front-back direction of the body in an upright posture facilitates both securing a large internal space in the body and downsizing of the article transport vehicle as a whole. Given that the surfaces of the driver unit disposed in an upright posture to extend in the front-back direction of the body that face in the width direction have the largest area, cooling efficiency can be enhanced by using at least one of these surfaces as the cooling surface. Further-more, the driver unit can be cooled more efficiently, by directing travel-generated wind through the air guide path to the cooling surface, when the article transport vehicle is travelling. These factors enable an article transport vehicle to be realized that is readily downsized as a whole and is able to efficiently cool the driver unit.

Further features and advantages of the technology according to the present disclosure will become apparent from the following description of exemplary and non-limiting embodiments which will be described with reference to the drawings.

DESCRIPTION OF THE INVENTION

An embodiment of an article transport vehicle will be described with reference to the drawings. An article transport vehicle 1 of the present embodiment is used for transporting articles A in a facility (hereinafter referred to as "logistics facility") where the articles A are stored, sorted, and the like, for example.

Figure 1:
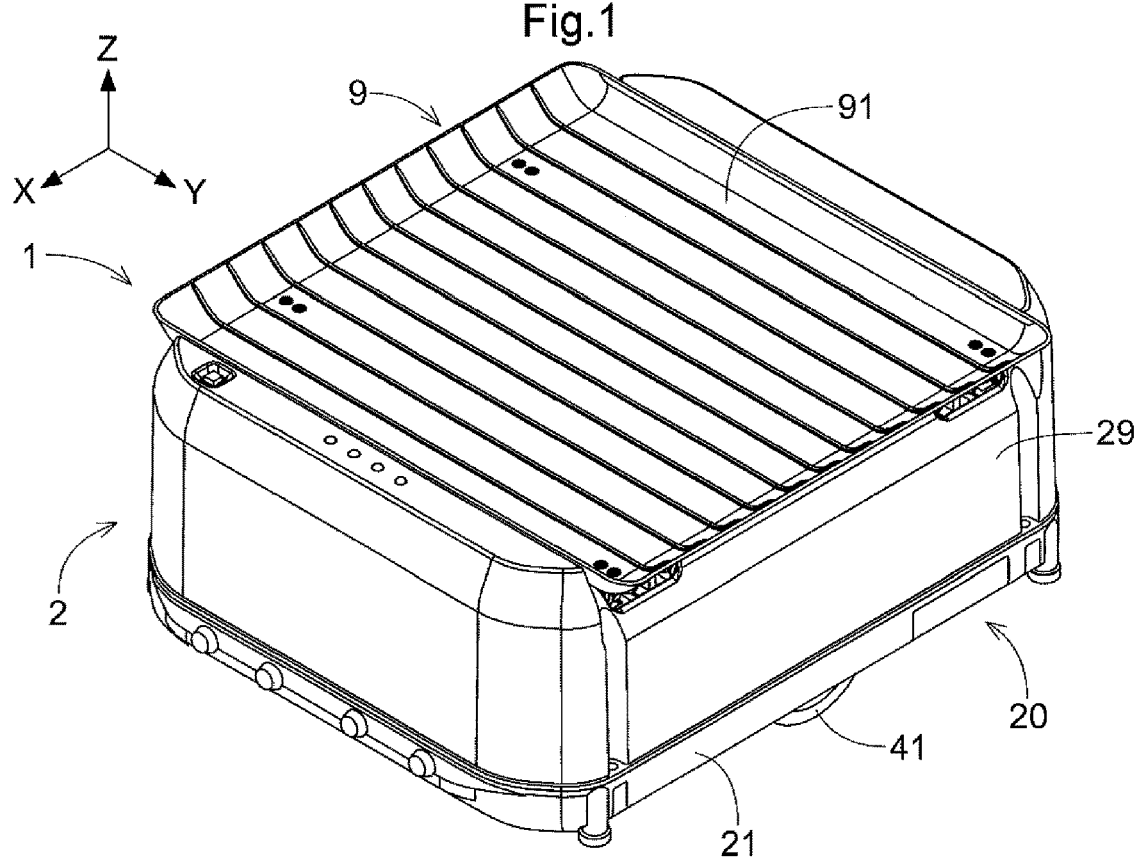
FIG. 1 is a perspective view of an article transport vehicle according to an embodiment.

As shown in FIG. 1, the article transport vehicle 1 includes a body 2 and a transfer device 9 that is mounted on the body 2 and transfers the articles A. The body 2 travels on a travel surface F (see FIG. 2). The travel surface F is, for example, a floor surface of the logistics facility. Hereinafter, the direction in which the article transport vehicle 1 (body 2) advances when traveling will be referred to as the "front-back direction X", a normal direction of the travel surface F will be referred to as the "up-down direction Z", and a direction perpendicular to the front-back direction X as viewed in the up-down direction Z will be referred to as the "width direction Y". Also, the forward direction side, which is one side in the front-back direction X, may be referred to as the "front side", and the opposite side thereto may be referred to as the "back side".

Figure 2:
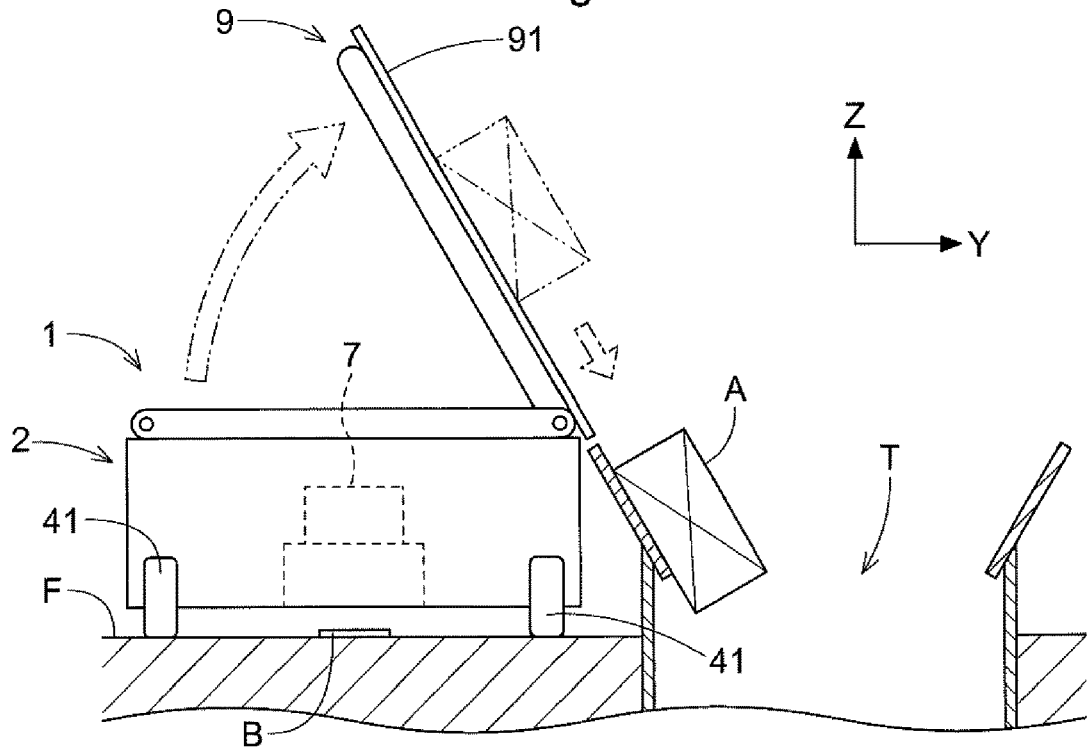
FIG. 2 is illustrative diagram of operations of the article transport vehicle.

The transfer device 9 includes a transfer tray 91. The transfer device 9 is switchable between a horizontal posture in which the transfer tray 91 is disposed horizontally along the upper surface of the body 2 (see FIG. 1) and an inclined posture in which the transfer tray 91 is inclined with respect to the upper surface of the body 2 (see FIG. 2). The transfer device 9 is able to place an article A on the transfer tray 91 in the horizontal posture. Also, as shown in FIG. 2, the transfer device 9 is able to slidingly transfer the article A from the transfer tray 91, by changing the transfer tray 91 from the horizontal posture to the inclined posture.

The article transport vehicle 1 is able to travel to a destination within the logistics facility with an article A placed on the transfer tray 91 in the horizontal posture, and to transport and deliver the article A to the destination with the transfer tray 91 in the inclined posture. Note that, as the destination within the logistics facility, an article input section T that inputs articles A sorted by shipping destination, such as shown in FIG. 2, for example, is given as an example.

Note that the article transport vehicle 1 of the present embodiment is an unmanned transport vehicle capable of unmanned travel. The article transport vehicle 1 includes a reading device 7, and is capable of unmanned travel while grasping its own position, due to the reading device 7 sequentially reading position information recorded in a plurality of position information storage sections B provided intermittently on the travel surface F. Examples of the position information storage sections B include barcodes such as one-dimensional codes and two-dimensional codes, RFID (Radio Frequency Identification) tags, and the like. As the reading device 7, a barcode reader, a tag reader, or the like is utilized, according to the type of location information storage section B.

Figure 3:
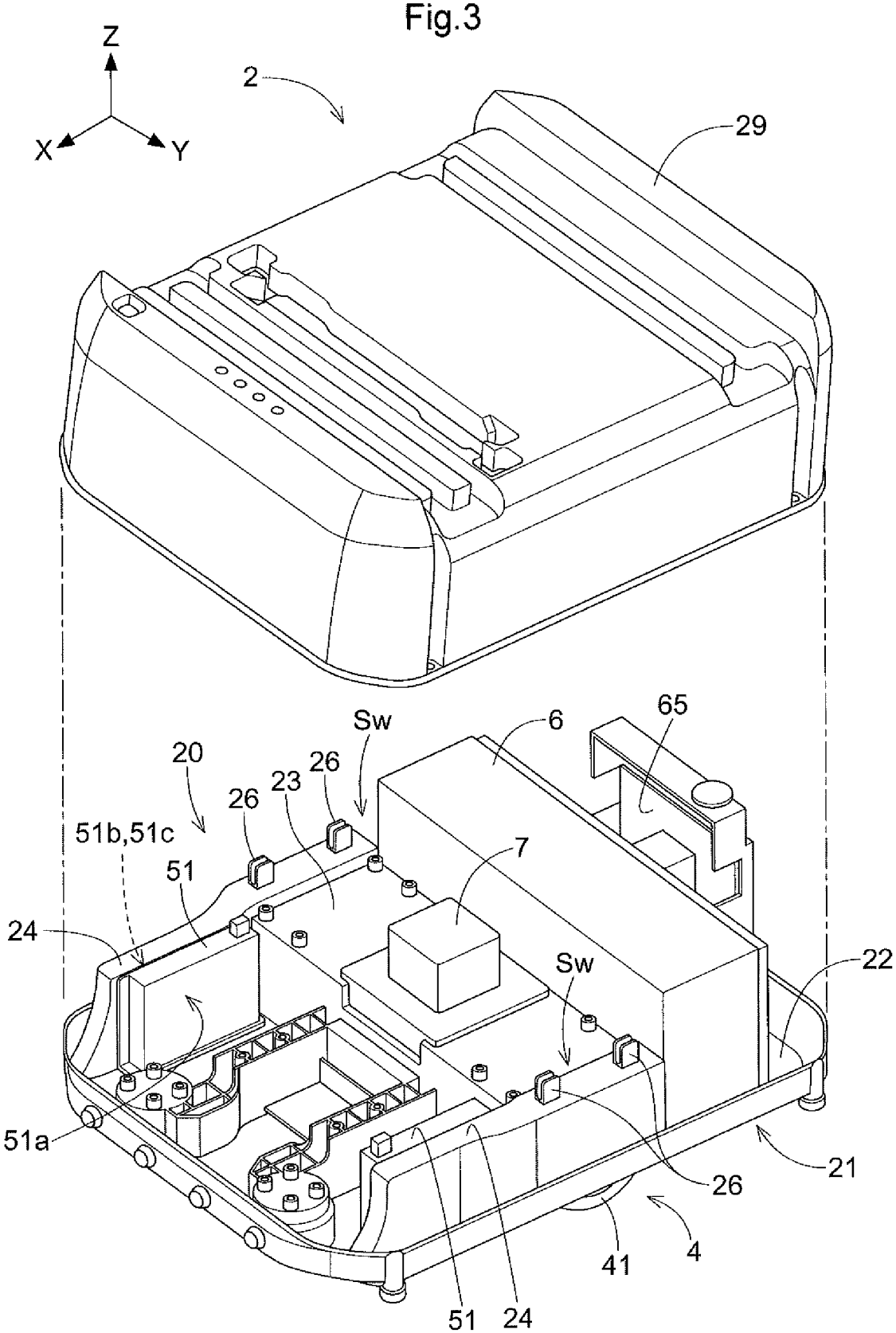
FIG. 3 is an exploded perspective view of a body.

FIG. 3 is an exploded perspective view showing the structure of the body 2, out of the body 2 and the transfer device 9 constituting the article transport vehicle 1 (illustration of the transfer device 9 is omitted). As shown in FIG. 3, the body 2 has a main body 20 and a cover 29 that is detachably attached to the main body 20 from above. Apart from the body 2 having the main body 20 and the cover 29, the article transport vehicle 1 includes a travel drive section 4, a control device 5, a power supply device 6, and a cable 8, as also shown in FIGS. 5 and 6.

The main body 20 includes a base 21 capable of supporting the travel drive section 4, the control device 5, the power supply device 6, and the cable 8. The base 21 is formed in a rectangular shape (in this example, a rectangular shape approximating a square in which portions of the four corners are chamfered) as viewed in the up-down direction. The base 21 has a flat bottom section 22 and a central ridge section 23 that rises upward from the bottom section 22 in a central portion thereof in the front-back direction X. Note that, on the back surface (lower surface) side of the central ridge section 23, there is a space recessed upward from a bottom surface 22a of the bottom section 22, as shown in FIG. 4, with this space constituting a wheel housing space 23a.

In the present embodiment, a travel drive support space Sd is constituted by the wheel housing space 23a on the back surface side of the central ridge section 23 of the base 21. Also, a control device support space Sc is constituted by a space on the front side, which is one side in the front-back direction X relative to the central ridge section 23 on the base 21. Also, a power supply device support space Sp is constituted by a space on the back side, which is the opposite side in the front-back direction X relative to the central ridge section 23 on the base 21.

Figure 4:
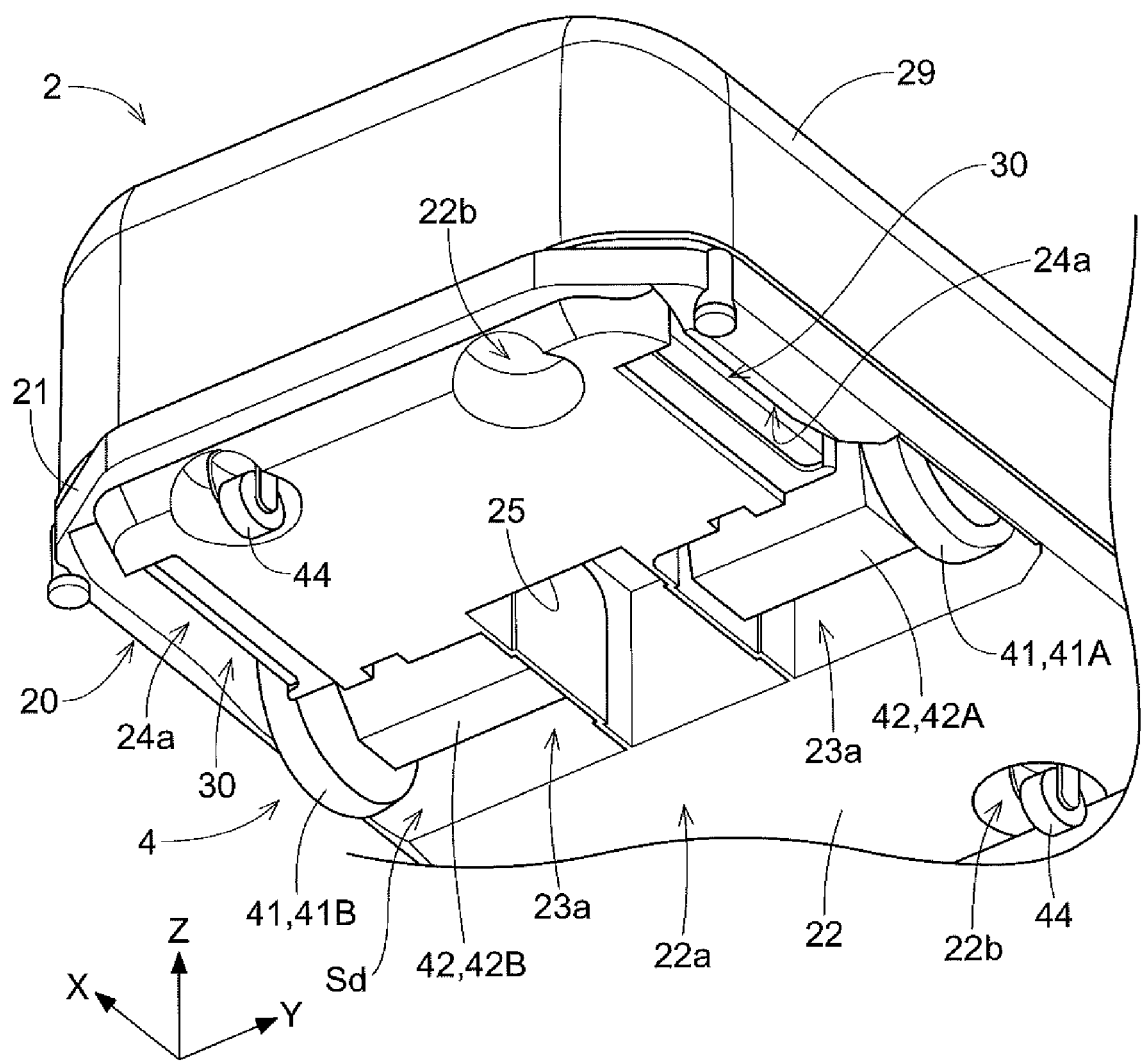
FIG. 4 is a perspective view from a bottom surface side of the article transport vehicle.
Figure 5:
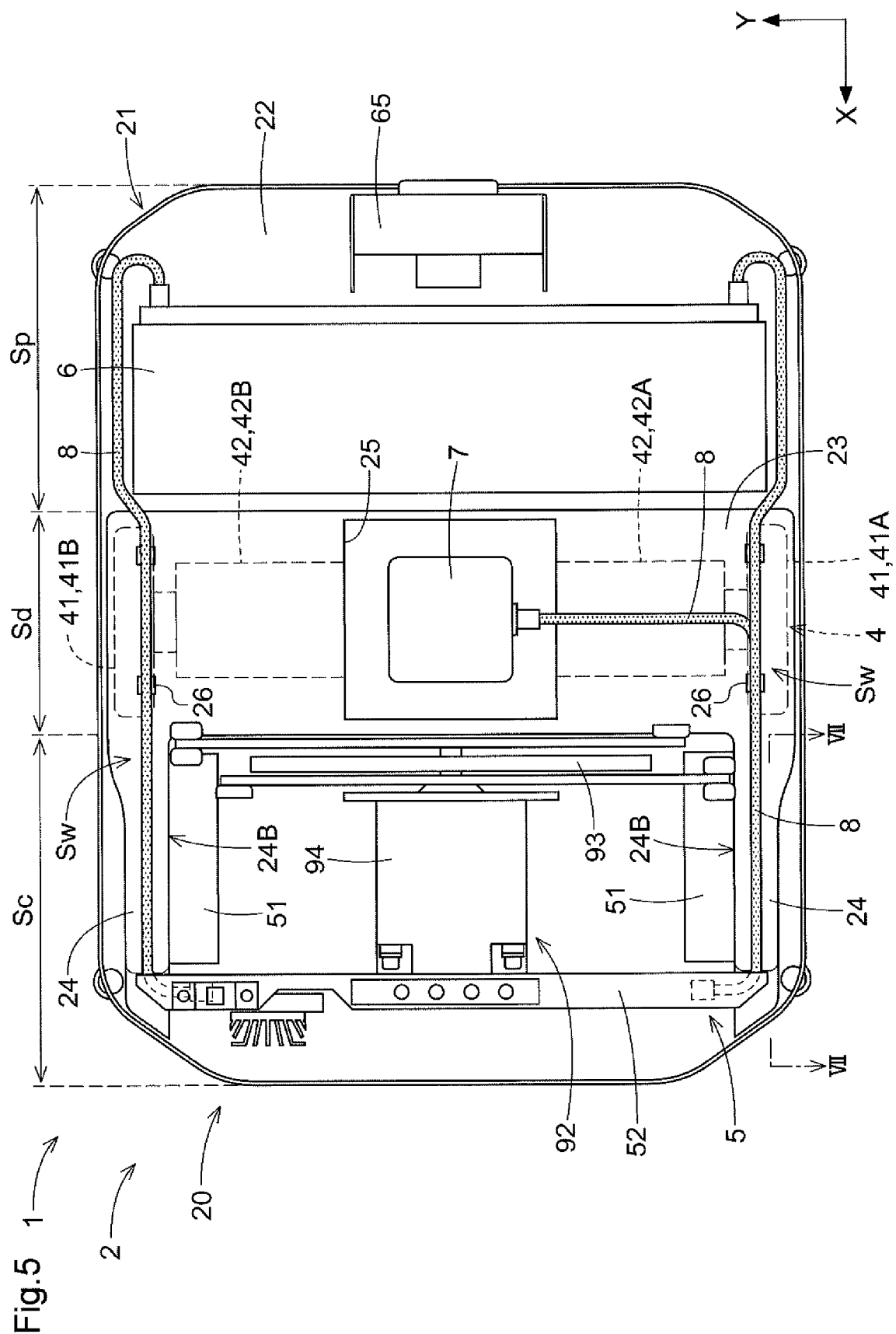
FIG. 5 is a plan view of the article transport vehicle.
Figure 6:
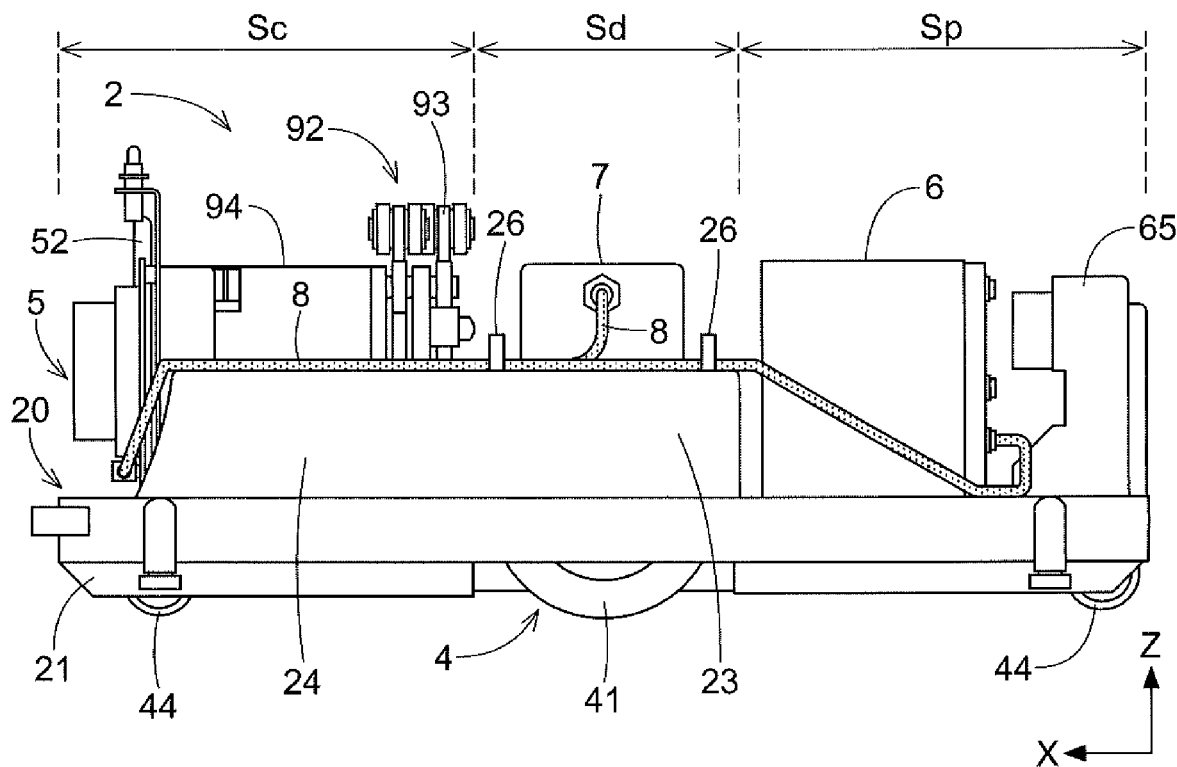
FIG. 6 is a side view of the article transport vehicle.

As shown in FIGS. 4 and 5, the travel drive section 4 is disposed in the travel drive support space Sd (wheel housing space 23a). The travel drive section 4 is thereby held by a central portion of the body 2 in the front-back direction X. Here, in the present embodiment, the travel drive section 4 includes a pair of wheels 41 and a pair of travel motors 42 for driving the wheels 41. The pair of wheels 41 are separated from each other in the width direction Y. The pair of travel motors 42 are each disposed on the same axis as the corresponding wheel 41 so as to be adjacent thereto in the width direction Y, and are coupled so as to rotate as one with the corresponding wheel 41. In the present embodiment, the travel motors 42 correspond to a "motor".

The wheel housing space 23a of the present embodiment is divided in two in the width direction Y, by an atrium-like window section 25 formed in a central portion of the base 21 in the width direction Y. A first set of a wheel 41 and a travel motor 42 is disposed in one of the two wheel housing spaces 23a, and a second set of a wheel 41 and a travel motor 42 is disposed in the other of the two wheel housing spaces 23a. That is, a first wheel 41A and a first travel motor 42A are disposed in one of the two wheel housing spaces 23a, and a second wheel 41B and a second travel motor 42B are disposed in the other of the two wheel housing spaces 23a.

Note that, in the window section 25 formed in the base 21, the reading device 7 is supported in such a manner as to be disposed facing the bottom surface 22a side (travel surface F side) of the bottom section 22. The reading device 7 is disposed between the first wheel 41A and the second wheel 41B of the body 2 in the width direction Y, and, more specifically, is disposed between the first travel motor 42A and the second travel motor 42B in the width direction Y.

In the present embodiment, at the end portions on the base 21 in the front-back direction X are formed recessed sections 22b that are separated from each other in the width direction Y and recessed in a round hole shape. In at least one of the recessed sections 22b is disposed an auxiliary wheel 44. FIG. 4 shows an example in which auxiliary wheels 44 are disposed in only two recessed sections 22b located diagonally, out of the four recessed sections 22b, but auxiliary wheels 44 may, for example, be disposed in all four of the recessed sections 22b.

As shown in FIG. 3, in the present embodiment, on the front side, which is one side in the front-back direction X relative to the central ridge section 23 of the base 21, is formed an extended ridge section 24 that rises upward from the bottom section 22 in the same manner as the central ridge section 23. The extended ridge section 24 is provided on each side of the base 21 in the width direction Y. Also, the extended ridge sections 24 are integrally provided continuously with the central ridge section 23 in the front-back direction X. In other words, portions on both sides of the central ridge section 23 in the width direction Y are extended on the front side, which is one side in the front-back direction X, with these extended portions being the extended ridge sections 24. The extended ridge sections 24 are provided in the control device support space Sc.

Note that, on the back surface (lower surface) side of the extended ridge sections 24, there are spaces that are recessed upward from the bottom surface 22a of the bottom section 22, as shown in FIG. 4, with these spaces constituting recessed spaces 24a. These recessed spaces 24a are integrally formed continuously with the wheel housing spaces 23a in the front-back direction X. Unlike the wheel housing spaces 23a, constituent components of the article transport vehicle 1 are not disposed in the recessed spaces 24a. The recessed spaces 24a constitute part of an air passageway 30 through which wind that is generated by travel of the article transport vehicle 1 passes.

As shown in FIGS. 3 and 5, the control device 5 is disposed in the control device support space Sc. The control device 5 is thereby supported on the front side of the body 2, which is one side in the front-back direction X relative to the travel drive section 4. Here, the control device 5 is a constituent component for controlling the travel motors 42, and, in the present embodiment, includes at least a driver unit 51 and a control board 52 (omitted in FIG. 3).

The driver unit 51 is a unit for rotationally driving the travel motor 42 and has a driver circuit that includes a semiconductor element. In the present embodiment, a pair of driver units 51 is also provided in correspondence with the pair of travel motors 42. That is, a first driver unit corresponding to the first travel motor 42A and a second driver unit corresponding to the second travel motor 42B are provided as the driver units 51.

The driver units 51 are each formed in a rectangular parallelepiped shape. The driver units 51 of the present embodiment are each formed in a flat rectangular parallelepiped shape in which the length of one of the three sides extending orthogonally to each other from each vertex is significantly shorter (e.g., less than ⅓) compared to the length of the other two sides. The surface constituted by the two long sides of the driver unit 51 has the largest area, and there are two such surfaces having the largest area that oppose each other. In the present embodiment, the two surfaces having the largest area and facing in opposite directions to each other will be referred to as a first surface 51a and a second surface 51b.

As shown in FIG. 3, the flat rectangular parallelepiped driver units 51 are disposed to extend in the front-back direction X of the body 2 in an upright posture. Here, "upright posture" means a posture in which the length (height) in the up-down direction Z is longer than at least one of the length in the front-back direction X and the length in the width direction Y. In other words, "upright posture" means a posture in which the first surface 51a and the second surface 51b, which are the two surfaces having the largest area and facing in opposite directions each other, face in the width direction Y (posture in which the first and second surfaces 51a and 51b extend in the up-down direction Z and the front-back direction X). In the present embodiment, the driver units 51 are fixed to the base 21 in an upright posture in which the longest side extends in the front-back direction X.

Figure 7:
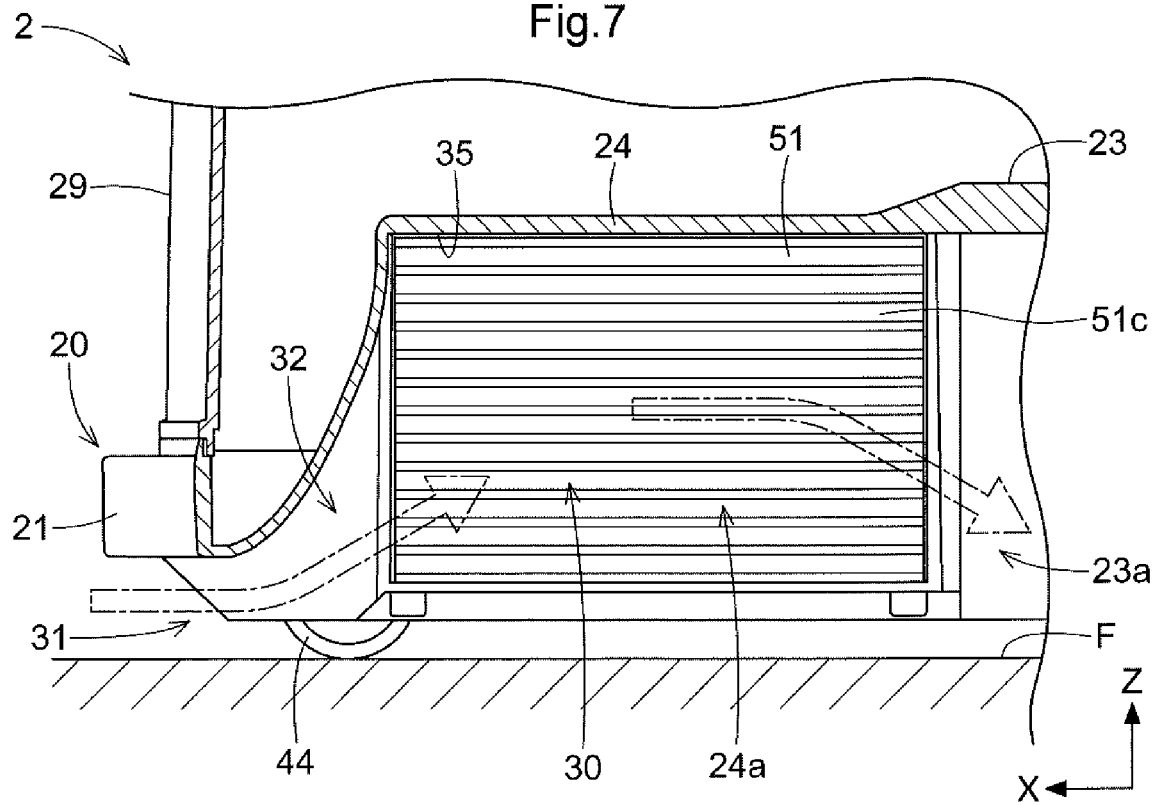
FIG. 7 is a cross-sectional view taken along VII-VII in FIG. 5.

Also, the driver units 51 are respectively fixed to the extended ridge sections 24 of the base 21. In the present embodiment, one of the two surfaces (first surface 51a and second surface 51b) of each driver unit 51 that face in the width direction Y is a cooling surface 51c (second surface 51b in the example in FIG. 3). The cooling surface 51c of the driver units 51 is a surface to be cooled in order to protect the built-in semiconductor elements. As shown in FIG. 7, uneven structures for promoting heat dissipation such as fins or pins, for example, are preferably formed on the cooling surface 51c.

In the lateral surface (inner lateral surface 24B; see FIG. 5) of each extended ridge section 24 of the base 21 that faces inward in the width direction Y (toward the center of the body 2 in the width direction Y) is formed a rectangular opening section 35 such as shown in FIG. 7. The driver units 51 are respectively fixed to the extended ridge sections 24 so as to cover the opening sections 35. The driver units 51 are respectively fixed to the inner lateral surfaces 24B of the extended ridge sections 24, such that the cooling surfaces 51c face the recessed spaces 24a through the opening sections 35.

Also, in the present embodiment, as shown in FIG. 7, in a lower end portion on the front side of the base 21 (bottom section 22) of the main body 20 in the front-back direction X is formed a lower opening 31 that is open in the front-back direction X. This lower opening 31 communicates with a diameter expansion section 32 whose height in the up-down direction Z gradually increases toward the back side in the front-back direction X, and further communicates with the recessed space 24a described above via this diameter expansion section 32.

When the article transport vehicle 1 travels forward, wind acts on the article transport vehicle 1 due to the relative movement thereof. This wind will be referred to as "travel-generated wind" in the present embodiment. This travel-generated wind is directed from the lower opening 31 through the diameter expansion section 32 to the recessed space 24a. The travel-generated wind then reaches the cooling surface 51c of the driver unit 51 exposed through the opening section 35 in the recessed space 24a, and cools the driver unit 51 through heat exchange with the cooling surface 51c. After cooling the driver unit 51, the travel-generated wind passes from the recessed space 24a via the wheel housing spaces 23a to outside of the body 2.

In the present embodiment, the air passageway 30 through which the travel-generated wind passes is constituted by a space that extends from the lower opening 31 to the recessed space 24a via the diameter expansion section 32, and further extends to the wheel housing space 23a. The air passageway 30 is disposed such that at least one (both in this example) of the travel drive section 4 and the power supply device 6 overlaps with the disposition region thereof in the width direction Y.

The control board 52 controls the travel motor 42 by controlling operation of the semiconductor elements included in the driver units 51. The control board 52 is constituted by mounting various electronic components on an insulated board. As shown in FIG. 5, the control board 52 is disposed in the control device support space Sc at a position on the front side, which is one side in the front-back direction X. Since the control device support space Sc is located on the front side of the body 2 in the front-back direction X, the control board 52 is disposed near the front end of the entirety of the body 2 in the front-back direction X. Also, the control board 52 spans substantially the entire control device support space Sc in the width direction Y.

As can be seen from FIGS. 3 and 6, the control device 5 is disposed at a position overlapping with the travel drive section 4 as viewed in the front-back direction X. In the present embodiment, the driver units 51 constituting the control device 5 entirely overlap with the travel drive section 4 as viewed in the front-back direction X. Part of the control board 52 (specifically, roughly half thereof in the up-down direction Z) overlaps with the travel drive section 4 as viewed in the front-back direction X.

In the present embodiment, a transfer drive section 92 is disposed in the control device support space Sc, in addition to the control device 5. The transfer drive section 92 is thereby supported on the front side of the body 2, which is one side in the front-back direction X relative to the travel drive section 4, similarly to the control device 5. The transfer drive section 92 is thus supported by a portion of the body 2 on the control device 5 side relative to the travel drive section 4. Here, the transfer drive section 92 is a configuration for controlling the posture change of the transfer tray 91 as part of the transfer device 9, and, in the present embodiment, includes at least a tilting mechanism 93 and a transfer motor 94.

In the present embodiment, the tilting mechanism 93 is constituted by a tilt lever that includes a link mechanism. The tilting mechanism 93 is fixed to the transfer tray 91, and is coupled to the transfer motor 94. The transfer motor 94 switches the transfer tray 91 between the horizontal posture and the inclined posture via the tilting mechanism 93, by driving rotationally. Note that the control board 52 described above also controls operation of the transfer motor 94.

In the present embodiment, as shown in FIG. 5, the tilting mechanism 93 is disposed on the back side of the control device support space Sc in the front-back direction X. The tilting mechanism 93 is disposed adjacent to the travel drive section 4 on the front side relative thereto in the front-back direction X. Also, the transfer motor 94 is disposed in a central portion of the control device support space Sc in the width direction Y. The transfer motor 94 is disposed over at least half of the region occupied by the control device support space Sc in the front-back direction X.

As can be seen from FIG. 6, the transfer motor 94 overlaps with the travel drive section 4 as viewed in the front-back direction X. In the present embodiment, part of the transfer motor 94 (specifically, roughly half thereof in the up-down direction Z) overlaps with the travel drive section 4 as viewed in the front-back direction X. All or most of the tilting mechanism 93 is disposed upward of the travel drive section 4.

As shown in FIGS. 3 and 5, the power supply device 6 is disposed in the power supply device support space Sp. The power supply device 6 is thereby supported on the back side of the body 2, which is the opposite side in the front-back direction X relative to the travel drive section 4. Here, the power supply device 6 is a constituent component for supplying power to at least the travel motors 42, and, in the present embodiment, also supplies power to the transfer motor 94 and the reading device 7. A secondary battery such as a lithium-ion battery, an electrolytic capacitor, an electric double layer capacitor, or the like, for example, can be used as the power supply device 6.

The power supply device 6 is disposed on the front side of the power supply device support space Sp in the front-back direction X. The power supply device 6 is disposed adjacent to the travel drive section 4 on the back side relative thereto in the front-back direction X. The power supply device 6 is a disposed over at least half of the region occupied by the power supply device support space Sp in the front-back direction X. Also, the power supply device 6 is disposed over substantially the entire region of the power supply device support space Sp in the width direction Y.

In the present embodiment, in the power supply device support space Sp is disposed a power receiving section 65, in addition to the power supply device 6. The power receiving section 65 is thereby supported on the back side of the body 2, which is the opposite side in the front-back direction X relative to the travel drive section 4, similarly to the power supply device 6. The power receiving section 65 is thus supported by a portion of the body 2 on the power supply device 6 side relative to the travel drive section 4. Here, the power receiving section 65 is a constituent component for receiving power during charging of the power supply device 6. The power receiving section 65 may, for example, be a connector in the case where charging of the power supply device 6 is performed by cable through a power line, or a power receiving coil in the case charging of the power supply device 6 is performed contactlessly.

The power receiving section 65 is disposed near the back end of the power supply device support space Sp in the front-back direction X. Since the power supply device support space Sp is located on the back side of the body 2 in the front-back direction X, the power receiving section 65 is disposed at the back end of the entirety of the body 2 in the front-back direction X. Also, the power receiving section 65 is disposed in a central portion of the power supply device support space Sp in the width direction Y.

As can be seen from FIG. 6, the power supply device 6 overlaps with the travel drive section 4 as viewed in the front-back direction X. In the present embodiment, part of the power supply device 6 (specifically, roughly half thereof in the up-down direction Z) overlaps with the travel drive section 4 as viewed in the front-back direction X. The power receiving section 65 also overlaps with the travel drive section 4 as viewed in the front-back direction X. In the present embodiment, part of the power receiving section 65 (specifically, roughly half thereof in the up-down direction Z) overlaps with the travel drive section 4 as viewed in the front-back direction X.

In the present embodiment, the driver units 51, the tilting mechanism 93, the transfer motor 94, the power supply device 6, the power receiving section 65, and the reading device 7 that are supported by the main body 20 are all disposed to fit within the region occupied by the control board 52 in the up-down direction Z. Therefore, a neat and compact rectangular parallelepiped body 2 is realized in which the dimensions in the up-down direction Z are kept small.

Also, focusing on the disposition of relatively heavy components, the pair of travel motors 42 are disposed in a central portion in the front-back direction X, the transfer motor 94 is disposed on the front side relative thereto, and the power supply device 6 is disposed on the back side, which is the opposite side thereto, as shown in FIG. 5. Adopting such a disposition configuration optimizes the weight balance of the body 2 in the front-back direction X.

The cable 8 electrically connects at least the control device 5 and the power supply device 6. In the present embodiment, a plurality of cables 8 are provided, with another cable 8 electrically connecting the control device 5 and the reading device 7. The cables 8 are disposed in a wiring space Sw provided to extend across the travel drive section 4 in the front-back direction X. Here, the wiring space Sw being provided to "extend across the travel drive section 4 in the front-back direction X" means that the wiring space Sw passes beyond the region occupied by the travel drive section 4 at a position overlapping with the travel drive section 4 as viewed in the up-down direction Z and extends to both sides thereof in the front-back direction X. In the present embodiment, the wiring space Sw extends across the travel drive section 4 in the front-back direction X from above the travel drive section 4.

In the present embodiment, the wiring space Sw is disposed lower than whichever of the uppermost part of the control device 5 (here, the uppermost part of the control board 52) and the uppermost part of the power supply device 6 is higher. Here, the wiring space Sw is disposed lower than both the uppermost part of the control device 5 and the uppermost part of the power supply device 6.

In the present embodiment, a region including at least the upper surfaces of both end portions of the central ridge section 23 of the base 21 in the width direction Y and the upper surfaces of the extended ridge sections 24 is part of the wiring space Sw. In the present embodiment, the wiring space Sw includes a region toward the center (reading device 7 side) of the central ridge section 23 in the width direction Y and a region on the outer side of the power supply device 6 (outer edge side of the base 21) in the width direction Y. The wiring space Sw is accessible from above with the cover 29 removed from the main body 20, as shown in FIG. 3. With such a configuration, the operator is able to easily operate the cables 8 from above, during maintenance and the like, for example.

As shown in FIGS. 3 and 5, in the wiring space Sw is provided a cable holding section 26 for holding the cables 8. In the present embodiment, the cable holding section 26 is provided at both end portions of the central ridge section 23 of the base 21 in the width direction Y. Two cable holding sections 26 are provided on each side in the width direction Y so as to be separated from each other in the front-back direction X.

Figure 8:
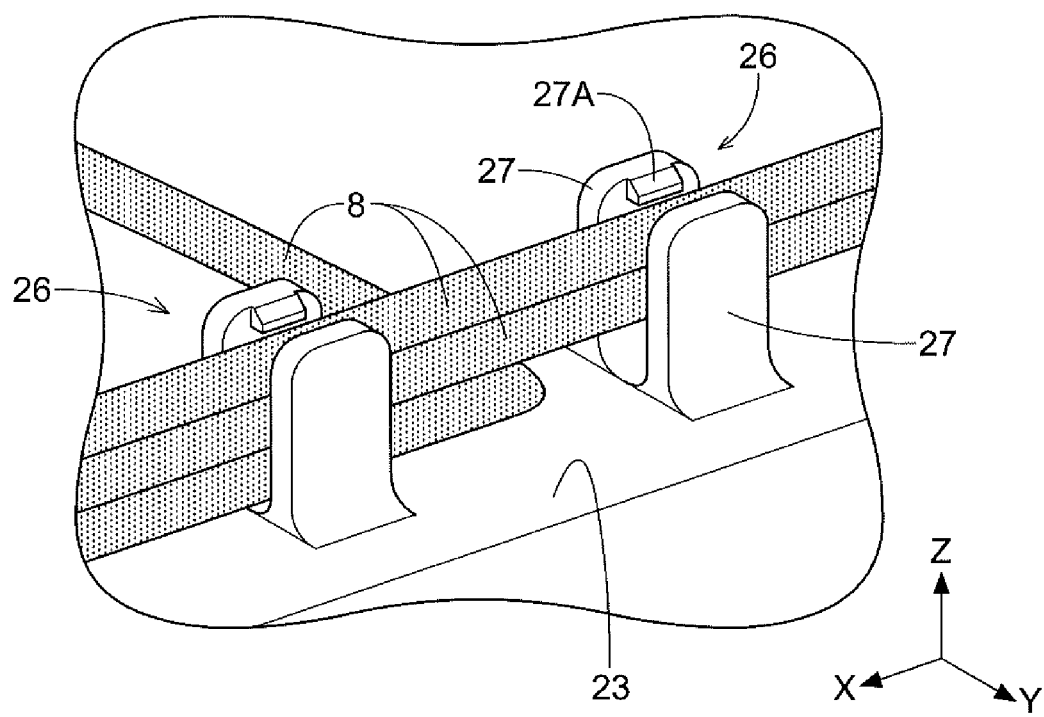
FIG. 8 is a perspective view of a cable holding section.
Figure 9:
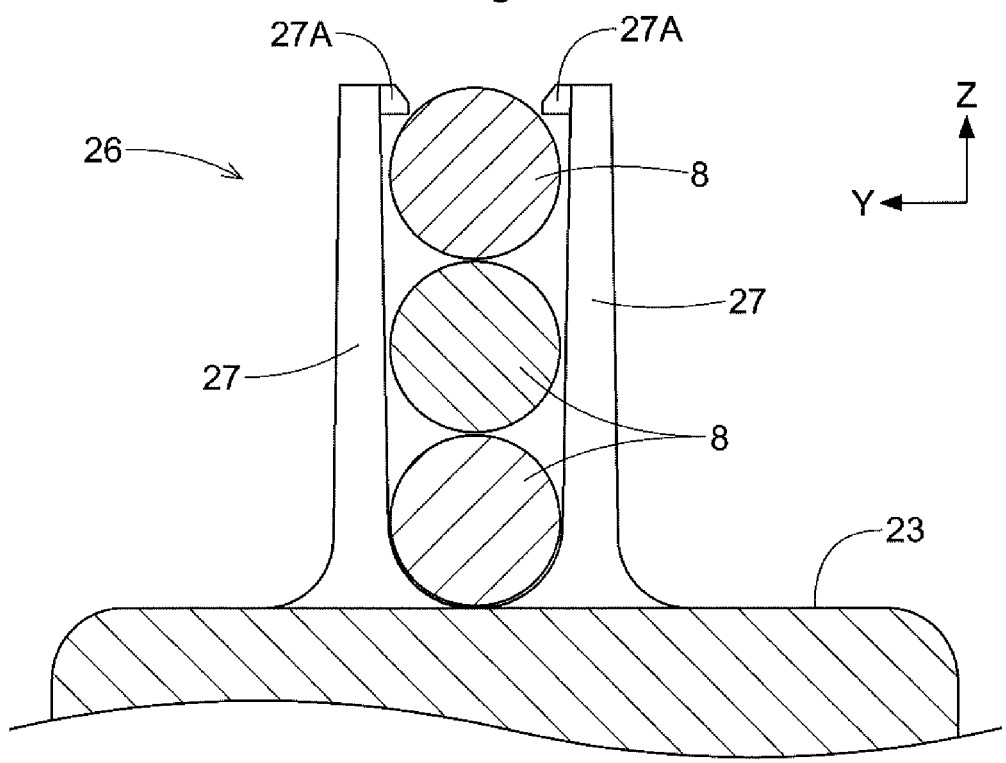
FIG. 9 is the front view of the cable holding section.

As shown in FIGS. 8 and 9, the cable holding section 26 of the present embodiment includes a pair of clamp arms 27 extending upward and disposed opposing each other in the width direction Y. The cable holding section 26 holds the cable 8 with the cable 8 housed between the pair of clamp arms 27.

In the present embodiment, the pair of clamp arms 27 are provided at upper end portions thereof with protruding pieces 27A that protrude inward (face each other). The protruding pieces 27A can be latched onto the uppermost cable 8 housed between the pair of clamp arms 27, and prevent the cable 8 from disengaging upward.

Other Embodiments (1) In the above embodiment, a configuration in which the cables 8 are disposed in the wiring space Sw provided so as to extend across the travel drive section 4 in the front-back direction X is described as an example. However, the disclosure is not limited to such a configuration, and the wiring space Sw may be provided so as to pass on the outer side of the travel drive section 4 in the width direction Y, for example, and not extend across the travel drive section 4, and the cables 8 may be disposed in that wiring space Sw.

(2) In the above embodiment, a configuration in which the cables 8 is disposed above the travel drive section 4 is described as an example. However, the disclosure is not limited to such a configuration, and the cables 8 may be disposed below the travel drive section 4. Such a configuration can be suitably applied in the case where, for example, the outer diameter of the travel motors 42 is significantly smaller than the outer diameter of the wheels 41.

(3) In the above embodiment, a configuration in which the travel drive section 4, the control device 5, and the power supply device 6 overlap each other as viewed in the front-back direction X is described as an example. However, the disclosure is not limited to such a configuration, and a configuration may be adopted in which at least one of the travel drive section 4, the control device 5, and the power supply device 6 does not overlap with the others thereof as viewed in the front-back direction X.

(4) In the above embodiment, a configuration in which the wiring space Sw is accessible from above with the cover 29 removed from the body 20 is described as an example. However, the disclosure is not limited to such a configuration, and, for example, a configuration may be adopted in which the wiring space Sw is only accessible from the side (outer side in the width direction Y) with the cover 29 removed from the main body 20. Such a configuration can be suitably applied in the case where, for example, the cables 8 are disposed below the travel drive section 4.

(5) In the above embodiment, a configuration in which the cable holding section 26 includes a pair of clamp arms 27 is described as an example. However, the disclosure is not limited to such a configuration, and the cable holding section 26 may be constituted by a band, clip, tape, or the like, for example, as long as the cables 8 can be held without issue.

(6) In the above embodiment, a configuration in which the transfer drive section 92 is supported by a portion on the control device 5 side relative to the travel drive section 4 in the front-back direction X is described as an example. However, the disclosure is not limited to such a configuration, and the transfer drive section 92 may be supported in the same region in the front-back direction X as the travel drive section 4, for example. Alternatively, the transfer drive section 92 may be supported by a portion on the power supply device 6 side relative to the travel drive section 4 in the front-back direction X.

(7) In the above embodiment, a configuration in which the power receiving section 65 is supported by a portion on the power supply device 6 side relative to the travel drive section 4 in the front-back direction X is described as an example. However, the disclosure is not limited to such a configuration, and the power receiving section 65 may be supported by the same region in the front-back direction X as the travel drive section 4, for example. Alternatively, the power receiving section 65 may be supported by a portion on the control device 5 side relative to the travel drive section 4 in the front-back direction X.

(8) In the above embodiment, a configuration in which the reading device 7 is disposed between the pair of wheels 41 in the width direction Y in the same region in the front-back direction X as the wheels 41 is described as an example. However, the disclosure is not limited to such a configuration, and the reading device 7 may be disposed in a different region in the front-back direction X from the wheels 41, such as in a portion on the control device 5 side relative to the travel drive section 4 or in a portion on the power supply device 6 side relative to the travel drive section 4, for example.

(9) In the above embodiment, a configuration in which the driver units 51 are formed in a rectangular parallelepiped shape is described as an example. However, the disclosure is not limited to such a configuration, and the driver units 51 may be formed in other shapes such as trapezoidal, triangular, and semicircular, for example, as viewed in the width direction Y, as long as the driver units 51 can at least be disposed in an upright posture.

(10) In the above embodiment, the opening section 35 is formed in the inner lateral surface 24B of the extended ridge section 24, and the driver unit 51 is fixed such that the cooling surface 51c faces the recessed space 24a through the opening section 35. However, the disclosure is not limited to such a configuration, and a configuration may be adopted in which the opening section 35 is not formed in the inner lateral surface 24B of the extended ridge section 24. In such a case, the driver unit 51 may be fixed such that the cooling surface 51c is in intimate contact with the inner lateral surface 24B of the extended ridge section 24, and the driver unit 51 may be cooled via the inner lateral surface 24B of the extended ridge section 24.

(11) In the above embodiment, a configuration in which the recessed space 24a and the wheel housing space 23a are integrally formed continuously in the front-back direction X is described as an example. However, the disclosure is not limited to such a configuration, and the recessed space 24a and the wheel housing space 23a may be formed independently of each other discontinuously. In such a case, the air passageway 30 is constituted by a space from the lower opening 31 to the recessed space 24a via the diameter expansion section 32, and does not include the wheel housing space 23a.

(12) In the above embodiment, a configuration in which travel-generated wind flowing through the air passageway 30 reaches the recessed space 24a from the lower opening 31 via the diameter expansion section 32, and further passes through to the wheel housing space 23a, assuming that the article transport vehicle 1 is moving forward, is described as an example. However, the disclosure is not limited to such a configuration, and the article transport vehicle 1 may travel in reverse. In such a case, travel-generated wind flowing through the air passageway 30 will reach the recessed space 24a from the wheel housing space 23a, and further pass through to the lower opening 31 via the diameter expansion section 32.

(13) In the above embodiment, the article transport vehicle 1 may include a configuration (flow promoting section) for promoting the flow of travel-generated wind through the air passageway 30. Examples of such a flow promoting section include an impeller that rotates as one with the wheels.

(14) The configurations disclosed in each of the above-described embodiments (including the above embodiment and other embodiments; this similar applies below) can also be applied in combination with configurations disclosed in other embodiments as long as no inconsistencies arise. With respect also to other configurations, the embodiments disclosed herein are exemplary in all respects and can be modified as appropriate without departing from the spirit of the disclosure.

Summary of the Embodiments

In summarizing the above, the article transport vehicle according to the present disclosure preferably includes the following configurations.

An article transport vehicle for transporting an article, including:
a body;
a wheel held by the body;
a motor configured to drive the wheel; and
a driver unit configured to control the motor,
wherein the driver unit is disposed to extend vertically and in a front-back direction of the body,
in the driver unit, at least one surface facing in a width direction orthogonal to the front-back direction as viewed in an up-down direction is a cooling surface, and
the body is provided, in a bottom section thereof, with an air guide path configured to guide travel-generated wind to the cooling surface.

According to this configuration, disposing the driver unit to extend in the front-back direction of the body in an upright posture facilitates both securing a large internal space in the body and downsizing of the article transport vehicle as a whole. Given that the surfaces of the driver unit disposed in an upright posture to extend in the front-back direction of the body that face in the width direction have the largest area, cooling efficiency can be enhanced by using at least one of these surfaces as the cooling surface. Furthermore, the driver unit can be cooled more efficiently, by directing travel-generated wind through the air guide path to the cooling surface, when the article transport vehicle is travelling. These factors enable an article transport vehicle to be realized that is readily downsized as a whole and is able to efficiently cool the driver unit.

As one mode, preferably the body has a recessed space recessed upward from a bottom surface, and
the air guide path includes the recessed space.

According to this configuration, an air guide path that guides travel-generated wind to the cooling surface of the driver unit disposed in an upright posture can be appropriately constituted, by forming a recessed space that is recessed upward from the bottom surface in the body and utilizing this recessed space.

As one mode, preferably the body has an opening section communicating with the recessed space, and the driver unit is disposed in such a manner that the cooling surface faces the recessed space through the opening section.

According to this configuration, the driver unit can be efficiently cooled, by travel-generated wind directed to the recessed space from the opening section formed in the body.

As one mode, preferably the wheel is disposed in a wheel housing space recessed upward from the bottom surface in the bottom section of the body, and
the recessed space and the wheel housing space are continuous in the front-back direction.

According to this configuration, the recessed space constituting the air guide path can be appropriately formed, by utilizing the wheel housing space that is recessed upward from the bottom surface of the body. Accordingly, further downsizing of the article transport vehicle can be achieved.

As one mode, preferably the driver unit has a rectangular parallelepiped shape.

According to this configuration, the installation density of the driver unit itself can be enhanced, and an even larger internal space can be secured in the body. Therefore, it is possible to realize an article transport vehicle that is even more readily downsized as the whole.

The article transport vehicle according to the present disclosure need only achieve at least one of the above-described effects.

What is claimed is:

1. An article transport vehicle for transporting an article, comprising:
a body;
a wheel held by the body;
a motor configured to drive the wheel; and
a driver unit configured to control the motor, and
wherein the driver unit is disposed to extend vertically and in a front-back direction of the body,
wherein in the driver unit, at least one surface facing in a width direction orthogonal to the front-back direction as viewed in an up-down direction is a cooling surface, and
wherein the body is provided, starting in a bottom section thereof, with an air guide path configured to guide travel-generated wind to the cooling surface.

2. The article transport vehicle according to claim 1, wherein the body has a recessed space recessed upward from a bottom surface, and
wherein the air guide path includes the recessed space.

3. The article transport vehicle according to claim 2, wherein the body has an opening section communicating with the recessed space, and
wherein the driver unit is disposed in such a manner that the cooling surface faces the recessed space through the opening section.

4. The article transport vehicle according to claim 2, wherein the wheel is disposed in a wheel housing space recessed upward from the bottom surface in the bottom section of the body, and
wherein the recessed space and the wheel housing space are continuous in the front-back direction.

5. The article transport vehicle according to claim 1, wherein the driver unit has a rectangular parallelepiped shape.

6. The article transport vehicle according to claim 5, wherein a first surface and a second surface of the driver unit having the largest areas and facing in opposite directions to each other, face the width direction.

7. The article transport vehicle according to claim 1,
wherein the body includes a base supporting the wheel, the motor and the driver unit,
wherein a lower opening that is open in the front-back direction is formed in a lower end portion on a front side of the base in the front-back direction, and
wherein the lower opening is an inlet of the air guide path.

8. The article transport vehicle according to claim 7,
wherein the base has a recessed space recessed upward from a bottom surface,
wherein the air guide path includes the recessed space,
wherein the wheel is disposed in a wheel housing space recessed upward from the bottom surface in the bottom section of the base, and
wherein the lower opening, the recessed space and the wheel housing space communicate with each other in the front-back direction.

9. The article transport vehicle according to claim 7,
wherein the base has a recessed space recessed upward from a bottom surface,
wherein the air guide path includes the recessed space, and
wherein the lower opening and the recessed space communicate with each other in the front-back direction via an expansion section whose height in the up-down direction gradually increases toward a back side in the front-back direction.

* * * * *